George T. Atkins, Jr. Inventor
By P. L. Young Attorney

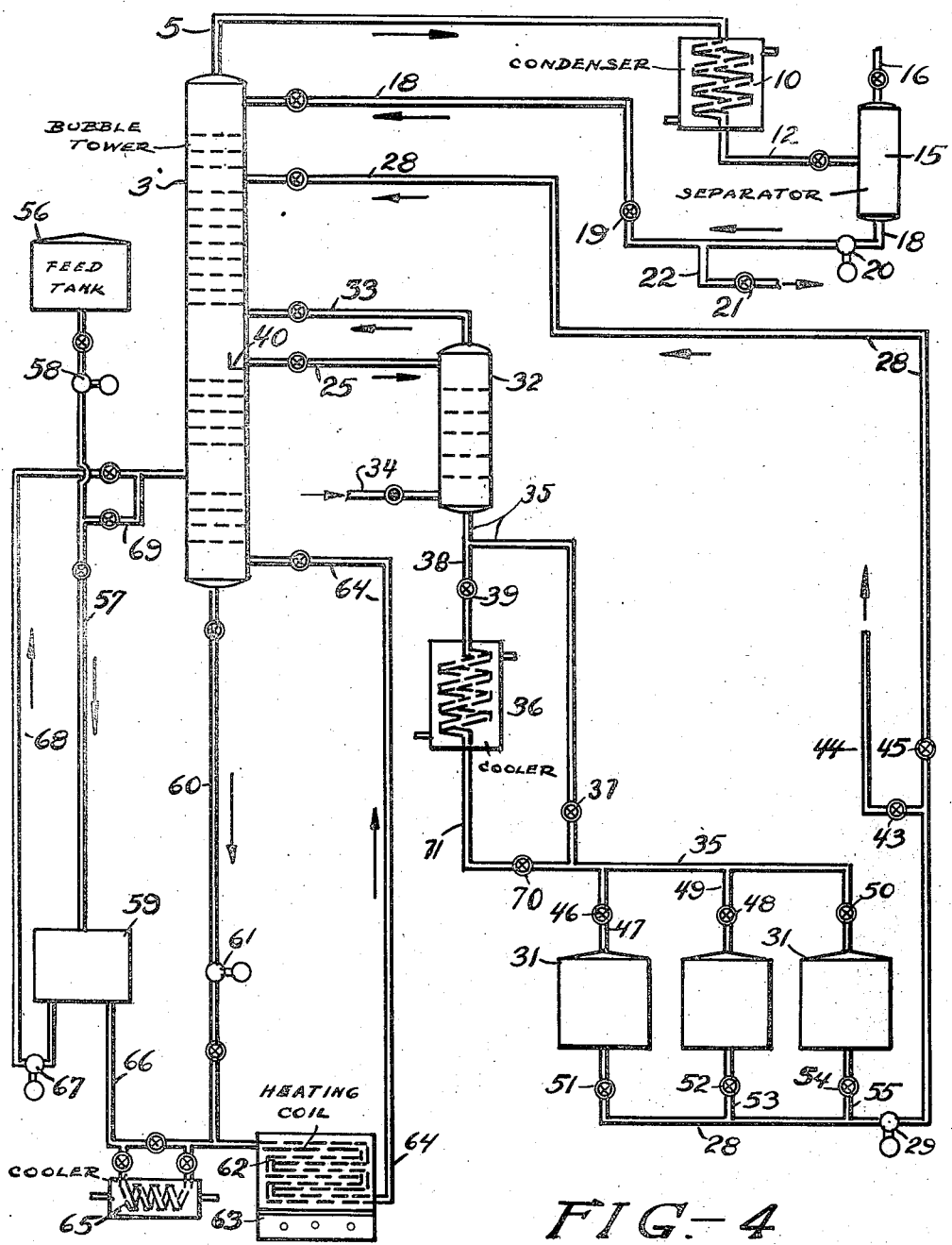

Patented Aug. 6, 1946

2,405,393

UNITED STATES PATENT OFFICE 2,405,393

BATCH DISTILLATION

George T. Atkins, Jr., Highlands, Tex., assignor to Standard Oil Development Company, a corporation of Delaware Application December 23, 1941, Serial No. 424,165

3 Claims. (Cl. 196—72)

The present invention relates to an improved method of distilling liquids containing a plurality of components. A particularly valuable application of my present invention relates to the batch distillation of petroleum oils under conditions such that the distillation may be carried out in given equipment at a greater rate than has been possible heretofore.

One object of my present invention is to carry out the batch distillation of a liquid charging stock containing a plurality of components in such a manner as to secure desired components at a greater rate than has been heretofore possible.

Another object of my present invention is to distill, in a batch operation, a petroleum oil in a process wherein I am enabled to perform the distillation more economically and rapidly than has been heretofore possible.

Figure 1:
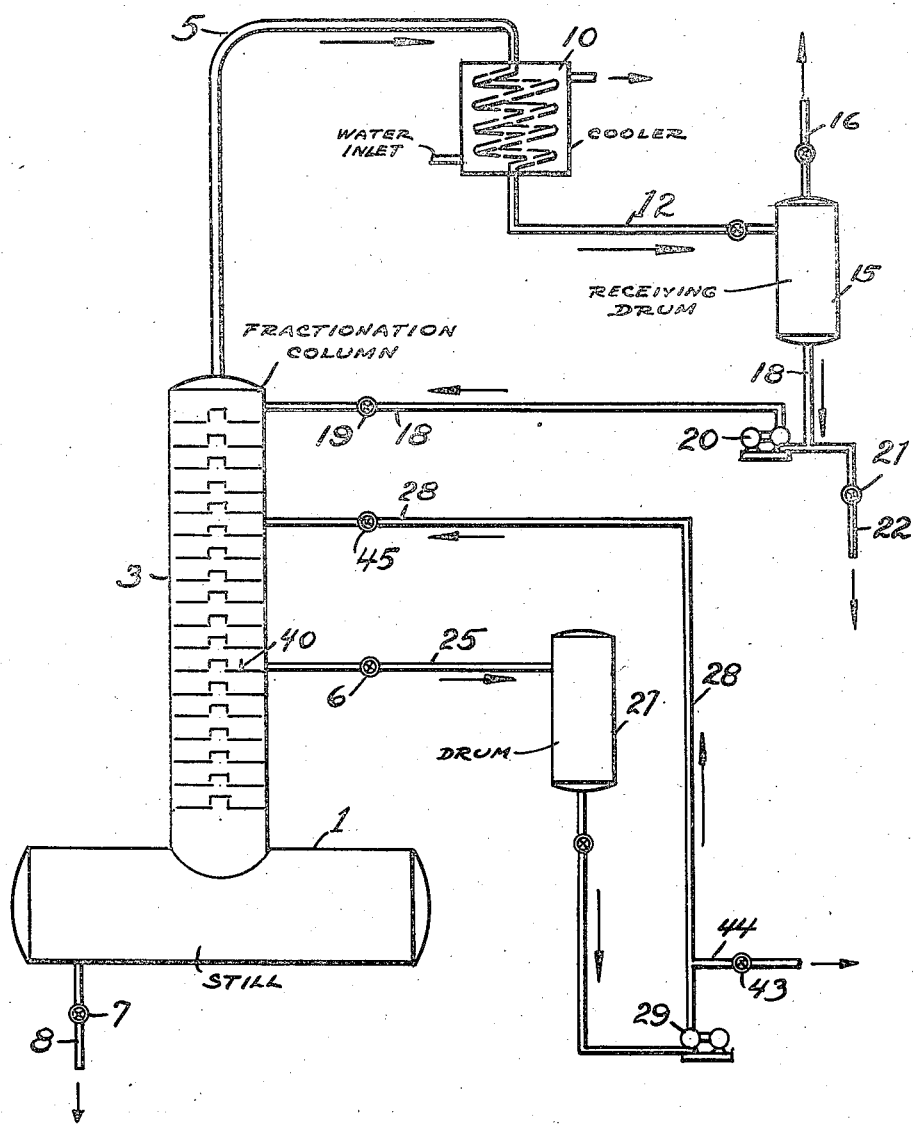

My invention will be best understood by reference to the accompanying drawings in which I have shown in Figure 1 diagrammatically a form and arrangement of apparatus elements embodying a preferred modification of my invention.

Figure 2:
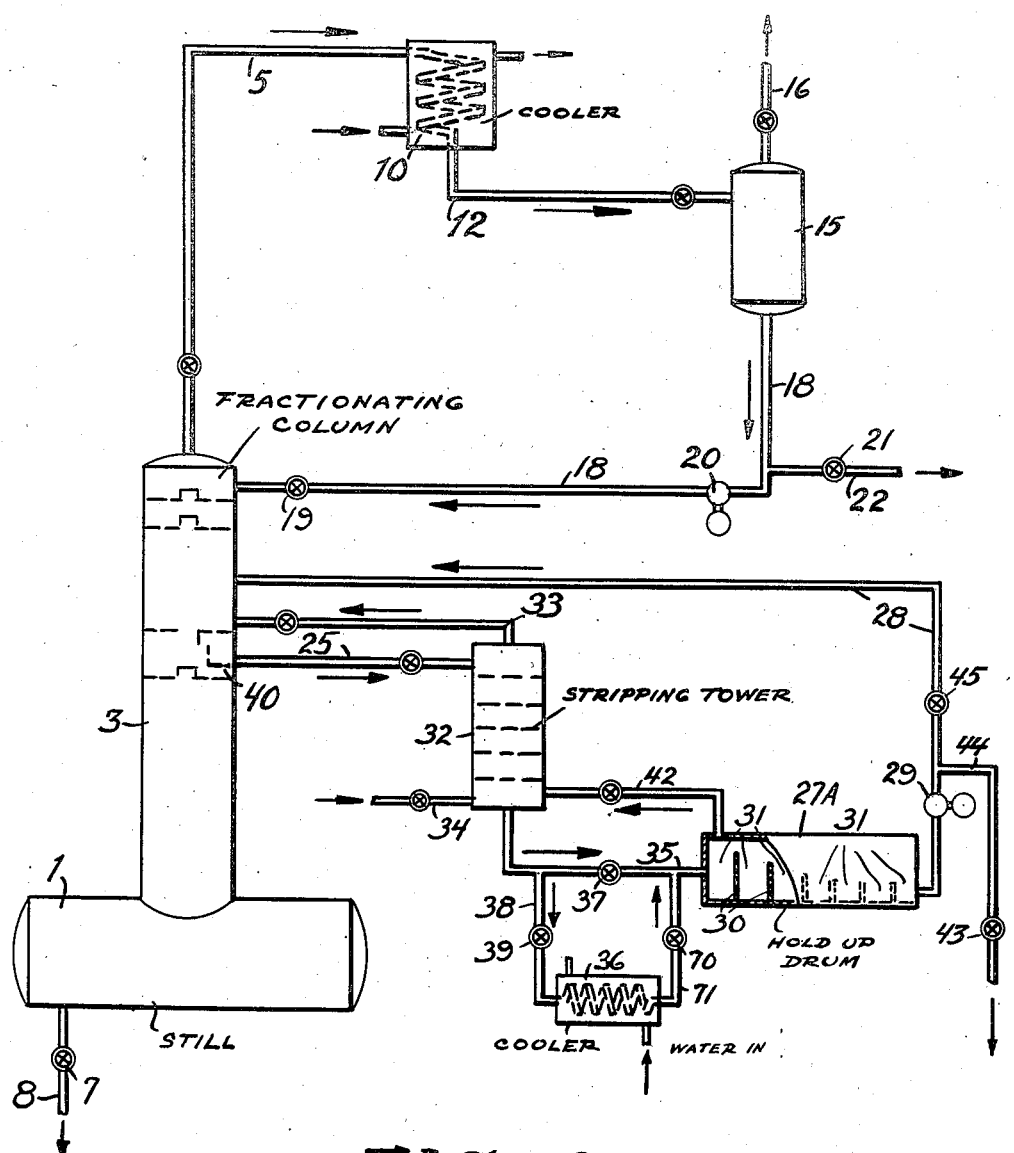

In Figure 2 I have shown schematically a further modification of my invention.

Figure 3:
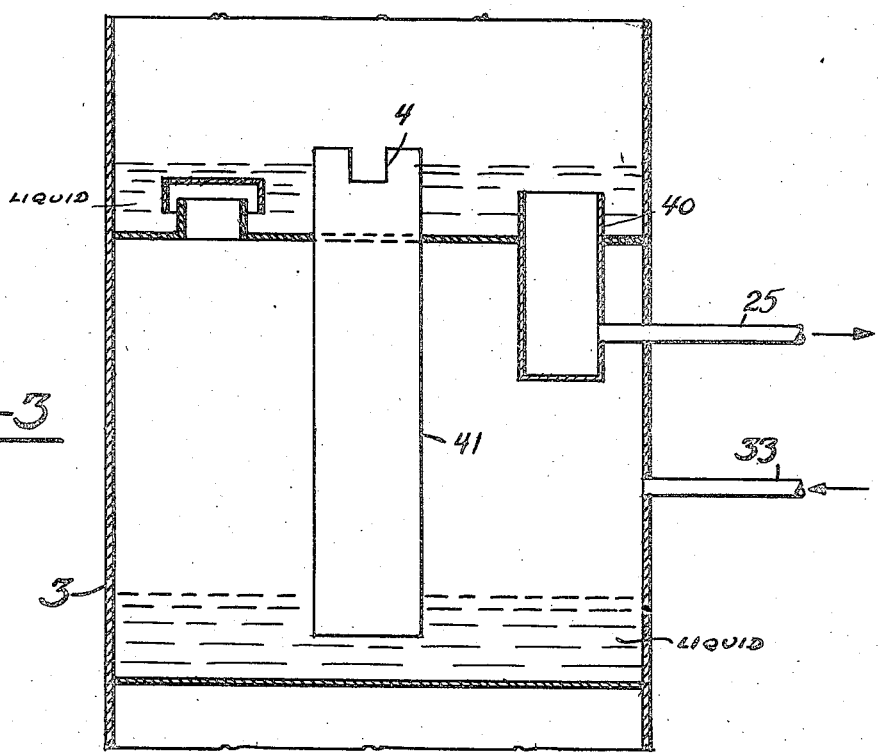

In Figure 3 draw-off line 40 and column 3 are shown in partial section.

In Figure 4, I have shown diagrammatically a preferred embodiment of my invention in which a batch distillation is conducted in a series of finite steps.

Figure 5:
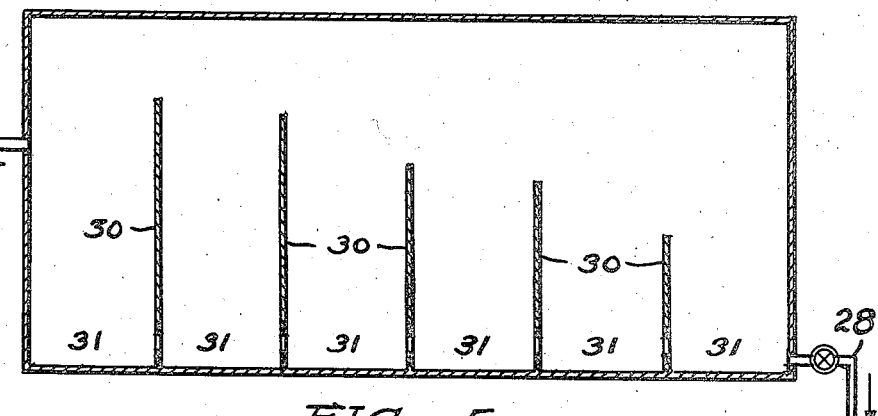

Figure 5 is an enlarged detail showing of a hold-up drum forming an important feature of my invention.

Similar reference characters apply to similar parts throughout the several views.

I shall now proceed to set forth a specific example illustrating my invention by means of a full description of a distilling operation embodying said invention, and, in so doing, I shall refer to the accompanying drawings, but it is to be distinctly understood that the precise details I am about to set forth are purely illustrative and do not constitute a limitation on my invention.

Referring in detail to Figure 1, a batch still 1 is charged with, say, 1,000 gallons of a crude petroleum oil. In the modification I have shown, a fractionating column 3 of the usual bubble cap plate tower construction is superimposed, as shown, upon the said still. The oil in the still may be heated by any conventional method, such as by a flame or steam or by any other known method. As heat is applied, the oil begins to vaporize and vapors passing up said column are withdrawn from the top through line 5, are condensed in cooling coil 10, and are thence discharged through line 12 into a receiving drum 15. Vapors which are not condensed in cooling coil 10 under the conditions of operation may be vented from the system through line 16. During the initial stages of the distillation, the unit is operated under total reflux, that is to say, all of the material collected in receiving drum 15 is withdrawn through line 18 and recycled by pump 20 to a point in the fractionating column above the top plate thereof. This phase of the distillation continues until the plates within the tower contain the normal quantity of liquid and until sufficient liquid has been supplied by the distillation to fill a hold-up drum 27, which is in communication with fractionating column 3 on the inlet side through line 25, and on the outlet side through line 28 and pump 29.

In order to further improve the distillation and fractionation of the charging stock to remove desired products, I provide in the lower part of the fractionating column 3, weirs and pipes to proportion and handle the liquid flowing in column 3 in the vicinity of the inlet to line 25. It is well known to divide a liquid reflux stream into two portions inside a distillation column, to control the relative amounts of the two portions, to withdraw one portion as a draw-off stream from the column and to direct the other stream downwardly to the section of the column below the draw-off point. Any suitable means of accomplishing the desired result may be employed, but one modification which can be used with good results is illustrated in Figure 3. As shown in Figure 3, a draw-off pipe 40 is disposed at the point in the tower where the liquid is withdrawn through line 25. It will be noted that this draw-off pipe is disposed with its upper end just below the normal liquid level on the plate and just above the point at which liquid is withdrawn from the tower through line 25. I also provide on the plate a second down pipe 41 (see Figure 3) and it will be noted that this pipe extends above the liquid level on the plate and carries a notch 4 having a horizontal dimension approximately 20% of the weir length of the draw-off box 40, which supplies liquid to line 25. The above-mentioned horizontal dimension may vary normally from 10 to 30% of the weir length.

During the filling of the hold-up drum 27, the initial material withdrawn from the tower through line 25 constitutes the lightest fractions of the charging stock except where non-condensed vapors are vented through pipe 16 (see Figure 1), since the tower is operating under conditions of total reflux. As the distillation proceeds, the fractions withdrawn through line 25 progressively increase in boiling points. After drum 27 has been filled with liquid, valve 21 in line 22, which is in communication with line 18, is opened and the withdrawal of products is begun. At this point in the operation, the material returned to the tower in line 28 has approximately the same boiling range as the product in the reflux line. The fraction returned to column 3 from hold-up drum 27 has a somewhat higher boiling point than the reflux; nevertheless, it serves as a satisfactory substitute for at least a substantial part of the reflux normally employed in line 18. Thus, by returning liquid through line 28, less reflux need be returned through line 18 and, consequently, the amount of product withdrawn through line 18, valve 21, and line 22 in a given unit of time, is greater than is normally obtainable when operating a batch distillation unit of the same size in conventional manner.

After the removal of the initial material, the next successive fraction is then distilled and the operation continues progressively through fractions of higher and higher boiling point until the distillation has been completed and a final residue is produced in the still which is withdrawn through valve 7 and line 8 and is further processed, or alternatively, cooled and stored in equipment not shown. In the production of the distillate fractions of successively higher boiling point, reflux is supplied to the top of column 3 through line 18 in constant or varied amount according to the required purity of the component or fraction being distilled, higher ratios of reflux to product being used while producing the products of higher purity and, lower reflux ratios being used on those fractions which are to be produced at a higher rate for the sake of greater capacity.

Thus, there are periods during the distillation of the charge stock when relatively little reflux is returned to column 3 from accumulator 15, the amount of reflux required depending upon the quality and purity of the liquid returning to column 3 from hold-up drum 27. In some cases, e. g., when a distillate fraction of relatively narrow boiling range produced under relatively high reflux ratio is followed by a distillate fraction of substantially higher boiling range, it will be found that the liquid contained in line 28 is of approximately the desired boiling range and that valve 19 controlling the flow of reflux in line 18 can be completely closed, without including undesirable amounts of higher boiling fractions or components in the distillate.

The rate of return of liquid from hold-up drum 27 through line 28 to column 3 is related to the rate at which vaporization occurs and to the rate at which liquid passes down the tower to draw-off pipe 40; and the rate of withdrawal of liquid from column 3 through valve 6 and line 25 to hold-up drum 27 is related to the rate at which liquid is allowed to flow from the draw-off point 40 down the plates of the tower below the draw-off point to the still. The amount of liquid held-up in drum 27 is related to the rates of withdrawal and return to column 3 and these rates are related to vapor and liquid rates in column 3 as previously mentioned, in such a way that when a lesser quantity of reflux is returned to column 3 through line 18, and a correspondingly greater quantity of distillate is withdrawn through valve 21 and line 22, a corresponding decrease in the amount of liquid held-up in drum 27 is experienced. During periods in the distillation when the rate of withdrawal of distillate through line 22 is substantially less than average for the entire distillation, and considerably less than the rate of vaporization from the still, the quantity of liquid held-up in drum 27 will normally be increased at the expense of the liquid remaining in still 1.

By alternately conserving and expending the liquid in drum 27 accordingly, as more or less reflux is used, a supply of liquid is maintained for return to column 3 near the top so as to augment the supply either of reflux or of distillate, depending upon whether the boiling range of the fraction being distilled is to be relatively narrower or wider.

Consequently, my process provides means for producing, in larger quantities per unit of time than has heretofore been possible, well-fractionated products; and, in still larger quantities, sufficiently well-fractionated products for purposes where a very high degree of purity is not required; and consequently, the process has good flexibility.

In the modification which I have shown in Figure 2, it will be obvious from inspection of the drawings that the essential difference between this modification and my prior described modification resides in the inclusion of a steam stripping tower 32, provision for cooling the steam stripped liquid in cooling coil 36, and the use of a horizontal hold-up drum 27—A containing weirs or perforated partitions 30 which are disposed in said hold-up drum to form a series of compartments 31 in cascade arrangement, so as to reduce the degree of normal free mixing of the various fractions retained in the several compartments 31, there shown. While I have described hold-up drum 27—A as an entity with said compartments, in some instances, such as in the embodiment which will be hereinafter described in conjunction with Figure 4, the said compartments may be separate tanks to which the hold-up liquid is delivered from column 3 according to a progressive cycle; conversely the hold-up liquid may be withdrawn from the separate compartments or tanks in the same manner in which the respective fractions were produced. For example, the liquid fraction having the lowest boiling point is pumped back to column 3, while the liquid fractions of higher boiling range are being accumulated. Flexibility of operation and segregation of fractions of intermediate boiling range may thuswise be obtained. Steam is injected into stripper 32 through line 34 to remove the more volatile fractions from the liquid introduced therein through line 25; steam stripping of the withdrawn liquid contributes to an improved degree of fractionation. The vapors removed from steam stripper 32 are returned to column 3 by means of line 33. The steam stripped liquid withdrawn from tower 3 is introduced through line 35 into hold-up drum 27—A which is provided with a series of partitions 30 dividing said hold-up drum in cascade into a number of compartments 31. Equalizing line 42 connects hold-up drum 27—A and steam stripper 32. In some particular instances, it may be desirable to cool the steam stripped liquid prior to introducing same into hold-up drum 27—A, and therefore, I have provided cooling coil 36 whereby said liquid may be cooled. In some special instances, it may be preferable and desirable to cool the liquid withdrawn from column 3 after rather than before segregating same in hold-up drum 27—A. When operating with cooling of the steam stripped oil, valve 37 in line 35 is closed off and valve 39 in line 38 and valve 70 in line 71 are opened thus allowing the oil to pass through cooling coil 36 and thence into hold-up drum 27—A. As hereinbefore described with relation to Figure 1, the liquid held-up in drum 27—A is pumped to tower 3 by means of pump 29 through line 28. After the distillation has proceeded and only heavy residue remains in still 1, a substantial amount of liquid may be segregated in drum 27—A for removal as a product through line 44. I have, therefore, provided a means for withdrawing this liquid from hold-up drum 27—A; when desired, valve 45 in line 28 is closed off and valve 43 in line 44 is opened. Thuswise, hold-up drum 27—A may be pumped free of any liquid remaining therein.

In another preferred modification of my invention in which batch distillation is conducted in a series of finite steps, reference will now be made to Figure 4 in which suitable apparatus elements illustrating the same are shown. A crude petroleum oil is introduced into column 3 from feed tank 56 through line 57 and pump 58. Provision is made whereby the oil contained in tank 56 may be introduced directly into column 3 as described; but when more convenient to do so, the oil from feed tank 56 may be introduced into tank or tanks 59 wherein it mixes with a bottoms fraction withdrawn from column 3 as will be described hereinafter. During the course of the distillation, liquid residue is collected in the bottom of column 3 for reboiling and for withdrawal from column 3. This liquid is withdrawn from column 3 by means of line 60 and a portion of same is pumped by pump 61 through a heating coil 62 disposed in furnace 63 and is returned through line 64 to the bottom of the tower at a point above the point of withdrawal but below the bottom plate. A second portion of the oil withdrawn from the bottom of column 3 is cooled in cooler 65 and is then introduced through line 66 into tank 59. Alternatively, the bottoms may be heat exchanged against the feed, or stored hot, where heat conservation is a controlling factor. Both feed and liquid residue may be held in the same tank, but it is preferred on principle to avoid mixing by the use of more than one tank. Tanks 59 are alternately filled with liquid residue and emptied by means of pump 67 and feed line 68 into column 3 at an intermediate point therein so that some stripping of the oil of its more volatile fractions is thereby effected. By-pass line 69 is provided so that the charge oil from feed tank 56 may be introduced directly into column 3 at the start of the run while lightest fractions are being distilled. In the modifications which I have described with reference to Figures 1 and 2, the oil is vaporized and passes up the tower, the overhead vapors being withdrawn through line 5 and cooled and condensed in cooling coil 10 and thence accumulated in accumulator 15. The method of withdrawing product and providing reflux to the top of the tower is substantially the same as has been described in connection with Figure 1 and therefore need not be described further herein. In the lower part of column 3, as mentioned before, I have provided a draw-off pipe 40 whereby liquid is withdrawn through line 25 to steam stripper 32 wherein more volatile fractions are removed from the withdrawn liquid. The vapors from steam stripper 32 are then introduced into column 3 through line 33. The steam stripped oil is withdrawn from stripper 32 through lines 35 and 38 and is cooled in cooler 36 and is then introduced into the first of a series of tanks 31. Provision is made whereby cooling coil 36 may be by-passed and the hot stripped oil delivered directly to tanks 31. When the oil is not cooled, valves 39 and 70 in lines 38 and 71 are closed and valve 37 in line 35 is opened, thereby allowing the stripped oil to be delivered directly through line 35 to tanks 31. In a batch distillation conducted in a series of finite steps as described in this embodiment, the first of the battery of tanks 31 is filled with oil from steam stripper 32; and this oil filling the first of the aforementioned tanks is of lower boiling point than the oil which is later introduced into the remaining tanks. It may be readily seen from this description and by reference to Figure 4 that when the first of tanks 31 is filled, said tank may be cut out by manipulation of valve 46 in line 47 and the second of the series of tanks may be filled by opening valve 48 in line 49. Successively, the remaining number of tanks may be filled with successive fractions of progressively higher boiling range. In a like manner the oil in the first filled tank 31 may be pumped back to tower 3 after opening valve 51 in line 28. And when the said oil in first tank 31 has been pumped out through pump 29, in turn, the oil in the second filled tank 31 may be pumped out by opening of valve 52 in line 53 and its contents returned in a like manner to column 3. Likewise the third tank 31 may be emptied by opening valve 54 in line 55 and pumping the oil back to the tower 3. Provision is made for pumping the contents of tanks 31 from the system through valve 43 and line 44 at the end of the run, the liquid pumped away then comprising distilled fractions of a higher boiling range than the products removed through valve 21 and line 22.

In the preferred embodiment which I have described with relation to Figure 4, a number of advantages are obtained which heretofore have not been possible with batch distillation equipment. Large batches of feed stock can be distilled economically and expeditiously in relatively simple equipment. Another advantage in my process with this particular embodiment lies in the recirculation of the bottoms so that the oil is maintained in the heating unit for only a relatively short time, whereby thermal decomposition of the oil, and the expense of large storage vessels for hot oil, are largely eliminated. Separation of the hold-up tanks into a series of separate and distinct units provides for greater flexibility, improved fractionation, and means for segregation of fractions of intermediate boiling range.

In the modifications which I have shown in Figures 1 and 2, and 4, I prefer to position the draw-off line in such a manner that 25 per cent of the plates of the tower are below line 25, 50 per cent of the plates are between the said line and line 28, and, of course, the remainder of the plates are above line 28. Obviously, there will be situations in which this positioning of lines 25 and 28 may vary within rather wide limits, depending on the stock to be distilled.

It is pointed out that I prefer to proportion the size of hold-up drums 27 and 27—A with respect to the size of still 1 in such a manner that the volume of 27 or 27—A is approximately 25% of that of the still 1 and contains a normal working inventory of approximately 10 or 15% of the contents of still 1.

While this invention has been described with respect to the batch fractional distillation of a crude petroleum oil, in its broader aspects, the invention is not to be limited to the distillation of crude petroleum or its fractions. For example, the method which I have disclosed may be employed to distill and purify other organic liquids besides petroleum fractions, such as alcohols, ethers, ketones, esters and the like.

Particularly useful adaptations of my invention reside in the segregation and purification of (1) solvent naphtha fractions, and (2) high octane number aviation gasoline blending agents, either from natural or synthetic sources, such as isopentane, isoheptane, isohexanes, iso-octanes and the like. Other petroleum or coal tar fractions such as those of the aromatic-type may also be segregated and purified by the process of my invention.

To recapitulate, my present invention relates to improvements in batch distillation of liquids containing a plurality of components. In its essence, my invention modifies prior practice by withdrawing from a lower point in a fractionation tower during distillation a quantity of liquid and returning it to a more elevated point in the fractionation column. In this manner it is possible to employ less reflux to the top of the tower than has heretofore been possible and, yet, obtain at an increased rate, well-fractionated products. In some instances no reflux is required, after the initial phase of the distillation.

It is to be reiterated that the invention resides in the provision of a hot material withdrawn at an intermediate point from the fractionation tower and the return of same to a point higher up in the tower than the point of withdrawal. The type of packing employed in the fractionation tower is not critical. For example, the tower may be of the bubble cap type with trays or it may be packed with Raschig rings, screen packing, or with any equivalent means whereby intimate contact between vapors and liquids is attained.

It is also to be understood that while I have described my invention with respect to providing reflux in the top of the tower by pumping a portion of the product back to column 3 above the top plate thereof, this method is for illustrative purposes only, since other means for inducing reflux in the top of tower may be employed such as by use of partial condensers or other equivalent means.

Many modifications of my invention will readily suggest themselves to those familiar with this particular art.

I claim:

1. In the batch distillation of liquids containing a plurality of components, the improvement which comprises heating said liquid to form vapors, discharging said vapors into the bottom of a vertical fractionating tower, successively withdrawing a plurality of liquid components of different boiling ranges from a point in the lower part of said tower as the distillation proceeds, maintaining said withdrawn components separately and segregated in an accumulation zone and returning the segregated components to the tower in the order of their withdrawal therefrom at a point in the tower more elevated than their point of withdrawal and separated from the latter by interior fractionating structure whereby the amount of reflux normally employed and recycled to the top of the tower is substantially reduced.

2. In the batch distillation of liquids containing a plurality of components, the improvement which comprises heating said liquid to form vapors, discharging said vapors into the bottom of a vertical fractionating tower, successively withdrawing a plurality of liquid components of different boiling ranges from a point in the lower part of said tower as the distillation proceeds, cooling the withdrawn components, maintaining said withdrawn components separately and segregated in an accumulation zone and returning the segregated components to the tower in the order of their withdrawal therefrom at a point in the tower more elevated than their point of withdrawal and separated from the latter by interior fractionating structure whereby the amount of reflux normally employed and recycled to the top of the tower is substantially reduced.

3. In the batch distillation of liquids containing a plurality of components, the improvement which comprises heating said liquid to form vapors, discharging said vapors into the bottom of a vertical fractionating tower, withdrawing a plurality of liquid components of different boiling ranges from a point in the lower part of said tower, discharging said withdrawn liquid components into an accumulation zone and returning the liquid components to the tower at a point in the tower where the boiling range of the liquid in the tower corresponds substantially to the boiling range of the liquid being returned thereto whereby the amount of reflux normally employed and recycled to the top of the tower is substantially reduced.

GEORGE T. ATKINS, JR.